US008526826B2

(12) United States Patent  
Eisenwinter et al.

(10) Patent No.: US 8,526,826 B2
(45) Date of Patent: Sep. 3, 2013

(54) REPEATER AND METHOD FOR OPERATING SUCH A REPEATER

(75) Inventors: Stefan Eisenwinter, Buchdorf (DE); Peter Schmid, Marxheim-Neuhausen (DE)

(73) Assignee: Andrew LLC, Hickory, NC (US)

( * ) Notice: Subject to any disclaimer, the term of this patent is extended or adjusted under 35 U.S.C. 154(b) by 217 days.

(21) Appl. No.: 12/921,357

(22) PCT Filed: Mar. 5, 2009

(86) PCT No.: PCT/EP2009/001575  
§ 371 (c)(1),  
(2), (4) Date: Dec. 7, 2010

(87) PCT Pub. No.: WO2009/112198  
PCT Pub. Date: Sep. 17, 2009

(65) Prior Publication Data  
US 2011/0103806 A1   May 5, 2011

(30) Foreign Application Priority Data  
Mar. 8, 2008   (DE) .......................... 10 2008 013 245

(51) Int. Cl.
| H04B 10/00 | (2013.01) |
| H04B 10/08 | (2011.01) |
| H04B 10/20 | (2011.01) |
| H04B 17/00 | (2006.01) |

(52) U.S. Cl.  
USPC ................. 398/173; 398/37; 398/62; 398/64; 398/18

(58) Field of Classification Search  
USPC ................... 398/11, 18, 37, 173–181, 62, 64; 359/173; 372/32  
See application file for complete search history.

(56) References Cited

U.S. PATENT DOCUMENTS 5,812,296 A * 9/1998 Tarusawa et al. ............. 398/116  
2001/0036210 A1* 11/2001 Salomaa ......................... 372/32

FOREIGN PATENT DOCUMENTS

| EP | 1605614 | * 12/2005 |
| EP | 1605614 A1 | 12/2005 |
| JP | 06-153255 | * 5/1992 |
| JP | 06153255 A | 5/1994 |

* cited by examiner

Primary Examiner — Kenneth N Vanderpuye  
Assistant Examiner — Abbas H Alagheband  
(74) Attorney, Agent, or Firm — Wood, Herron & Evans, LLP

(57) ABSTRACT

A repeater (1) includes a master unit (2) for communicating with a base station of a mobile network, a plurality of remote units (3) for communicating with mobile communications terminals, and a common optical waveguide (4) connecting the remote units (3) with the master unit (2) for transmitting the optical signals from each of the remote units (3) to the master unit (2). The remote units (3) include, as a transmitter for the optical signals, a laser (7) of a construction similar or somewhat identical to that of the other lasers (7). The lasers (7) have similar or somewhat identical nominal wavelengths ($\lambda_N$), and the individual lasers (7) are selected by adjusting their operating temperatures ($T_{D1}$-$T_{D4}$) in such a way that each laser transmits on a different transmission wavelength ($\lambda_{\ddot{u}1}$-$\lambda_{\ddot{u}4}$).

15 Claims, 2 Drawing Sheets

REPEATER AND METHOD FOR OPERATING SUCH A REPEATER

RELATED APPLICATIONS

This application claims priority to International Publication Number WO2009/112198, filed Mar. 5, 2009, entitled "REPEATER AND METHOD FOR OPERATING SUCH A REPEATER, which claims priority to German Application Serial No. 102008013245.4, filed Mar. 8, 2008, entitled "REPEATER AND METHOD FOR OPERATING SUCH A REPEATER", which applications are each incorporated herein by reference in their entirety.

FIELD OF THE INVENTION

The invention relates to a so-called repeater for a mobile network. The invention also relates to a method for operating such a repeater.

BACKGROUND OF THE INVENTION

Repeaters are used to enable telephoning with a mobile communications terminal in areas that are shadowed from radio waves, such as, for example, in a tunnel.

Such a repeater includes in its usual design, a master unit, which is in wireless or wire-bound communication connection with a base station of a mobile network. The repeater also includes several "remote units", for example, distributed over the length of the tunnel, for establishing the contact with the mobile communications terminal. Signal transmission between the master unit and the remote units is often effected as an amplitude-modulated optical analog signal via one or several optical waveguides, for example optical fiber or glass cables.

The master unit transfers the signal supplied to it by the base station to all remote units in the "downlink" direction. Each remote unit, on the other hand, transfers the signal supplied to it by a mobile communications terminal to the master unit in the "uplink" direction. An undisturbed signal transmission requires a separation of the individual signals, namely, on the one hand, of the downlink-signals from the uplink-signals, and, on the other hand, of the individual uplink-signals of the various remote units from each other.

This is achieved, for example, by transmitting each signal through a separate optical waveguide to a separate optical receiver, which is, however, relatively cost-intensive.

Alternatively, it is possible, in particular in the uplink direction, to use one common optical waveguide for the signal transmission of several remote units. To achieve a separation of the optical signals, each of the remote units conventionally includes a transmitter such as a laser, with each of the lasers having a nominal wavelength different from that of the other lasers and emitting light of a nominal wavelength. That is, a spectral separation of the uplink signals is effected, as each remote unit transmits on a different light wavelength. It is, however, a disadvantage in this type of data transmission that for each remote unit, an individual laser type has to be provided. This complicates in particular the maintenance of such a repeater.

SUMMARY OF THE INVENTION

The invention is directed to providing a particularly efficient repeater. Furthermore, the invention is directed to providing a particularly efficient method for operating such a repeater.

Regarding the device, these goals and other goals are met according to the invention by a repeater that includes a master unit for communicating with a base station of a mobile network, several remote units for communicating with mobile communications terminals, and a common optical waveguide, connecting the remote units with the master unit, for transmitting the optical signals from each of the remote units to the master unit. At least two of the remote units include, as a transmitter for the optical signals, a laser of a construction identical to that of the other laser and with a similar nominal wavelength. These lasers are selected, by adjusting their operating temperatures, in such a way that each laser transmits on a different transmission wavelength. Preferably, all remote units allocated to the repeater are equipped with lasers of identical or similar construction and with identical or similar nominal wavelengths, and are adjusted at such temperatures so that each laser transmits on a different transmission wavelength.

BRIEF DESCRIPTION OF THE DRAWINGS

In the following, an exemplary embodiment of the invention is explained in detail by means of a drawing, which.

Figure 1:
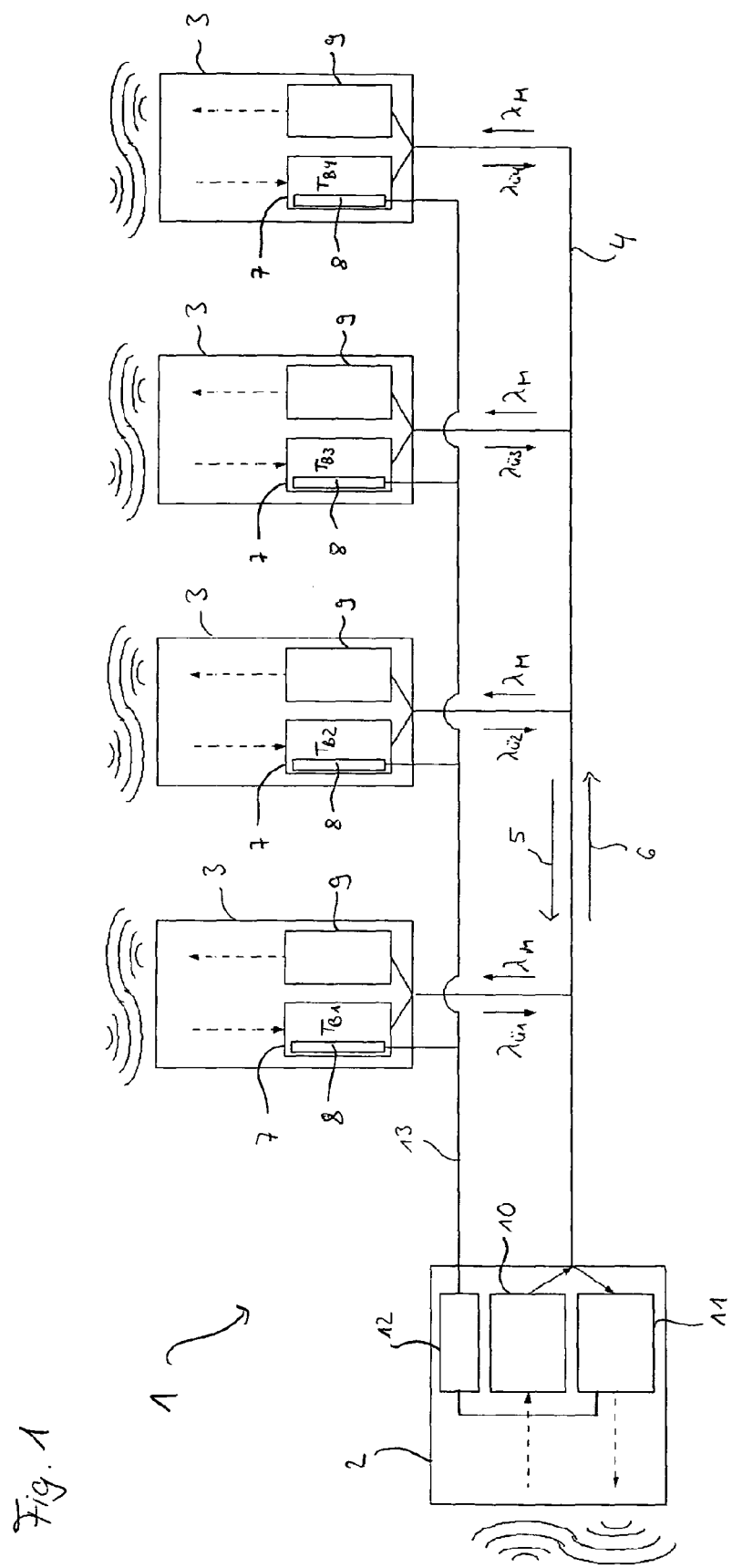
FIG. 1 shows a schematic representation of a repeater of a mobile network.

The accompanying drawings, which are incorporated in and constitute a part of this specification, illustrate embodiments of the invention and, together with a general description of the invention given below, serve to explain the principles of the invention. Parts and variables corresponding to each other are in all figures always identified by the same reference numbers.

DETAILED DESCRIPTION OF EMBODIMENT OF THE INVENTION

For operating the above-described repeater, one makes use of the fact that the emitted wavelength of a laser is influenced, among others factors, by its operating temperature. At least some of the lasers are deliberately used contrary to their specification by keeping at least all lasers except one on an operating temperature deviating from the respective specified nominal operating temperature of these lasers. Through this measure, the lasers are specifically detuned as compared with their nominal wavelength, in order to adjust the differing transmission wavelengths of the lasers.

By using the same laser type for all remote units, a relatively high degree of prefabrication is achieved for the remote units, thus saving stock keeping and maintenance costs.

In an advantageous embodiment, each laser comprises a Peltier element for adjusting its operating temperature. The Peltier element advantageously permits either heating or cooling of the laser—depending on the polarity. This makes it possible to adjust to a relatively wide temperature range and thereby, to adjust to a relatively wide frequency range. The Peltier element may be controlled by a thermistor resistor.

Preferably, the device may include a drive unit for automatically adjusting the operating temperatures. This drive unit is integrated, for example, in the master unit. In particular, the drive unit is provided with a software application designed for automatically choosing the operating temperatures of the individual lasers in such a way that all transmission wavelengths of the individual laser sufficiently differ from each other for a secure signal separation. Preferably, the operating temperatures of the lasers are chosen from a temperature range between 20° C. and 35° C. Expediently, there is always at least a wavelength difference of at least 0.35 nm between the individual transmission wavelengths.

Preferably, each laser has a nominal wavelength of 1547.72 nm. The transmission wavelengths of the lasers are preferably chosen from a wavelength range between 1545 nm and 1551 nm.

A particularly cost-advantageous variant of the repeater is advantageously realized by providing, both in uplink direction and in downlink direction, a single common optical waveguide for signal transmission between master unit and remote units. In this case, the master unit preferably uses a laser of a construction similar or somewhat identical with that of the lasers of the remote units, which has a nominal wavelength clearly differing from the nominal wavelengths of the lasers used in the remote units. In particular, the nominal wavelength of this laser is 1310 nm. Due to the great wavelength difference, advantageously and in a technically relatively inexpensive realization, a clear separation of the signals in uplink direction and downlink direction is achieved.

Preferably diode lasers, in particular so-called distributed feedback (DFB) diode lasers, are used. These lasers advantageously emit, at constant operating temperature, a highly monochromatic light and are particularly well suited for trans-mission of several optical signals through the same optical waveguide. These lasers enable a particularly narrow spectral distance of the different transmission wavelengths.

Such diode lasers are often sold with identical construction and identical nominal wavelengths and in several specification classes differing by their nominal operating temperature, or equivalently in the thermistor resistor to be provided for adjusting the nominal operating temperature. The reason for the different specification classes is manufacturing tolerances, due to which the identically constructed lasers reach the preset nominal wavelength at different temperatures.

In a preferred embodiment of the repeater, this circumstance is advantageously made use of in order to optimize the transmission wavelength range within a present temperature range. For this purpose, lasers of different nominal operating temperatures are allocated to the remote units. Lasers with a relatively low nominal operating temperature are systematically used for adjusting transmission wavelengths from an upper wavelength range, and lasers with a relatively high nominal operating temperature are used for adjusting transmission wavelengths from a lower wavelength range. Here again, the specified thermistor resistor of the lasers can be used as a measure for the nominal operating temperature.

Regarding the method, the above-mentioned goal is solved by using in a repeater with a master unit for communicating with a base station of a mobile network, with several remote units for communicating with mobile communications terminals, and with a common optical waveguide connecting the remote units with the master unit for transmission of optical signals from at least two, preferably each, of the remote units to the master unit, as transmitters of the remote units, lasers of identical construction and with identical nominal wavelengths and to select them by adjusting their operating temperatures in such a way that each laser transmits on a different transmission wavelength.

Parts and variables corresponding to each other are in all figures always identified by the same reference numbers.

FIG. 1 is a schematic representation of a repeater 1 of a mobile network, transmitting, by means of optical signals, radio signals into an area shadowed for radio waves, such as, for example, a tunnel.

The repeater 1 comprises a master unit 2, which communicates through schematically shown radio waves, with a base station (not shown) of the mobile network, not shown. In addition, the repeater 1 comprises several—in this representation, four—remote units 3, which are distributed over the length of a tunnel, for example. The remote units communicate by means of radio waves with a mobile communications terminal, not shown. The master unit 2 is connected with the remote units 3 via an optical waveguide of the repeater 1 that is disclosed as an optical fiber or glass cable 4.

The optical fiber or glass cable 4 provides for bidirectional optical signal transmission—or "signal transfer"—between the master unit 2 and the remote units 3. A radio signal coming in from the mobile communications terminal is transformed inside the remote unit 3 into an optical signal, transferred as an amplitude-modulated analog signal in the so-called uplink direction 5 (identified by an arrow) via the optical fiber or glass cable 4 to the master unit 2. The signal is retransformed at the master unit into a radio signal and transmitted to the base station.

Analogously, a radio signal coming in from the base station is transferred in the so-called downlink direction 6 (also identified by an arrow) from the master unit 2 via the optical fiber or glass cable 4 to the remote units 3 and finally transmitted to the mobile communications terminal.

For a faultless signal transmission via the optical fiber or glass cable 4, the individual optical signals must be distinguishable from each other. On the one hand, the signals of the individual remote units 3 must be distinguishable from each other. On the other hand, the signals in uplink direction 5 must be distinguishable from those in downlink direction 6.

For an optically separatable signal transmission in uplink direction 5, each remote unit 3 comprises, as a transmitter, a laser 7 that is disclosed and designed here as a so-called DFB (distributed feedback) diode laser 7, as one example. All diode lasers 7 are of very similar if not somewhat identical construction and specified for similar if not the same nominal wavelength $\lambda_N$ (FIG. 2) of 1547.72 nm. As the emitted wavelength of each diode laser 7 depends on its operating temperature $T_{B1}$-$T_{B4}$, each diode laser 7 for the remote units 3 includes a controlled Peltier element 8 for adjusting and keeping constant its operating temperature $T_{B1}$-$T_{B4}$. The operating temperature $T_{B1}$-$T_{B4}$ of the diode laser 7 is adjusted such that each diode laser 7 transmits on an individual transmission wavelength $\lambda_{Ü1}$-$\lambda_{Ü4}$, which is normally different from its nominal wavelength $\lambda_N$. Furthermore, each remote unit 3 includes an optical receiver 9 for receiving the signals of the master unit 2.

For signal transmission in downlink direction 6, the master unit 2, also includes, as a transmitter, a laser 10 designed as a DFB diode laser, as well as an optical receiver 11, for receiving the signals of the remote units 3. In the embodiment represented and illustrated in the Figures, this diode laser 10 is specified for a nominal wavelength $\lambda_N$ of 1310±10 nm, on which it actually transmits, so that its transmission wavelength $\lambda_M$ clearly differs from the transmission wavelengths $\lambda_{Ü1}$-$\lambda_{Ü4}$ of the diode lasers 7.

The suitable operating temperatures $T_B$ are chosen in a commissioning phase of the repeater 1. For this choice—here, automatic—of the operating temperatures $T_B$, the master unit 2 comprises a drive unit 12 provided with a software application. The drive unit 12 is connected with the Peltier elements 8, with respect to signal technology, via a signal cable 13. Alternatively, it is provided that the drive unit 12 selects the Peltier elements 8 by means of optical control signals transmitted via the optical fiber or glass cable 4. On the other hand, the drive unit 12 is coupled with the optical receiver 11 of the master unit 2.

For choosing the operating temperatures $T_{B1}$-$T_{B4}$, the drive unit 12 adjusts the operating temperature $T_B$ of a diode laser 7 and the optical receiver 11 records the resulting transmission wavelength λ. The operating temperature $T_B$ of a diode laser 7 is changed within a temperature range between 20° C. and 35° C. until its transmission wavelength $\lambda_Ü$ corresponds to a value preset by the software application. The preset transmission wavelengths $\lambda_Ü$ lie within a wavelength range between 1545 nm and 1551 nm. The software application chooses the transmission wavelengths $\lambda_Ü$ in such a way that the individual transmission wavelengths $\lambda_Ü$ of the remote units 3 differ from each other sufficiently, in particular by at least 0.35 nm.

In an alternative with simplified circuit technology, the nominal operating temperatures $T_S$ (FIG. 2) of the individual diode lasers 7 are stored in the drive unit 12. The drive unit 12 chooses the operating temperatures $T_{B1}$-$T_{B4}$ of the individual diode lasers 7 by means of this stored information in such a way that the resulting transmission wavelengths $\lambda_Ü$ sufficiently differ from each other, for faultless signal transmission. Using the signal cable 13 or the optical fiber or glass cable 4, the chosen operating temperatures $T_B$ are preset for the Peltier elements 8.

Figure 2:
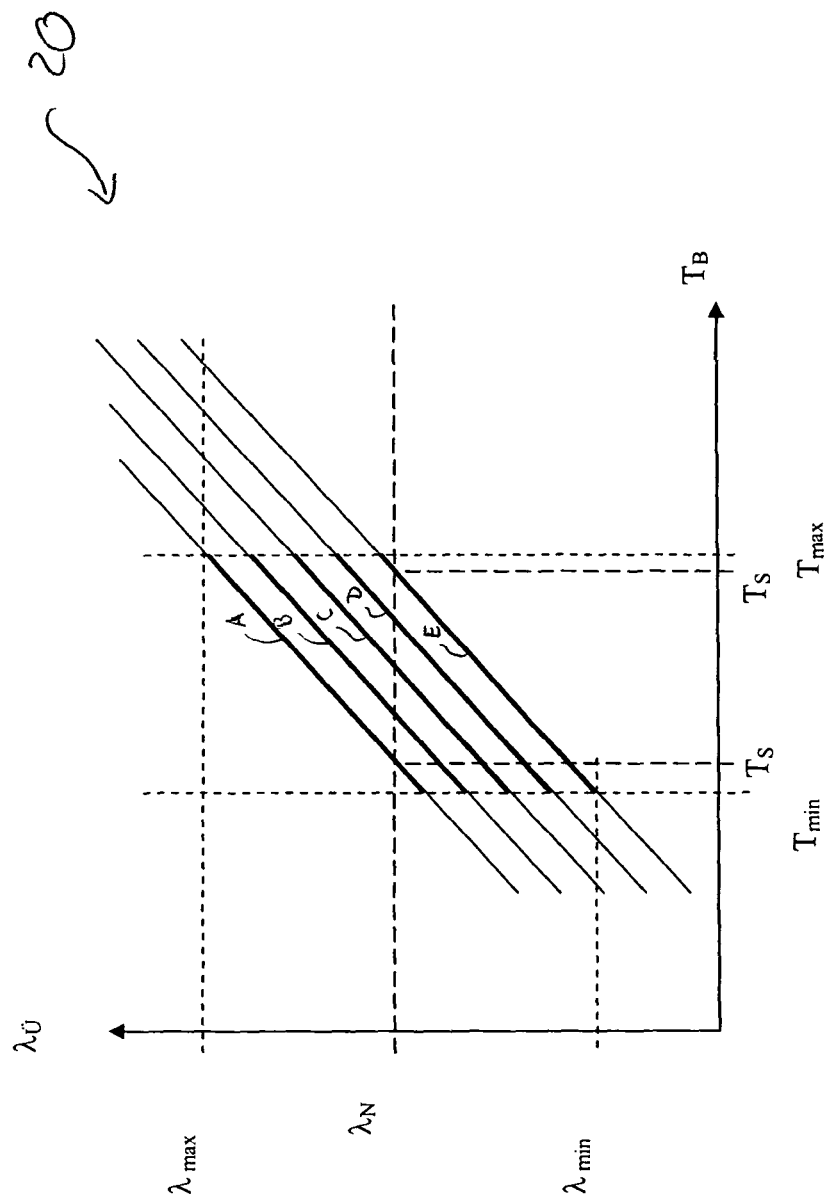
FIG. 2 shows a diagram for the use of different specification classes of a laser type used.

FIG. 2 schematically shows a diagram 20 for five specification classes A, B, C, D, E of the diode lasers 7 of identical construction and the dependence of the trans-mission wavelength $\lambda_Ü$ on the operating temperature $T_B$.

Within a specification class A, B, C, D, E, the transmission wavelength $\lambda_Ü$ linearly depends, as shown here by way of an example, on the operating temperature $T_B$ of the diode laser 7. In order to always achieve the same nominal wavelength $\lambda_N$, each specification class A, B, C, D, E is specified for a different nominal operating temperature $T_S$.

The diode lasers 7 are used in such a way that diode lasers 7 with a relatively high nominal operating temperature $T_S$ (for example, those of specification class E) are used for transmission wavelengths $\lambda_Ü$ from a lower wavelength range. The diode lasers 7 with a relatively low nominal operating temperature $T_s$ (for example, those of specification class A) are used for transmission wavelengths $\lambda_Ü$ from an upper wavelength range. In this way, a particularly large wavelength range between a minimum transmission wavelength $\lambda_{min}$ and a maximum transmission wavelength $\lambda_{max}$ is covered with a preset operating-temperature range between a minimum operating temperature $T_{min}$ and a maximum operating temperature $T_{max}$.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

LIST OF REFERENCE NUMBERS

1 Repeater
2 Master unit
3 Remote unit
4 Fiber-glass cable
5 Uplink direction
6 Downlink direction
7 Diode laser
8 Peltier element
9 Receiver
10 Diode laser
11 Receiver
12 Drive unit
13 Signal cable
20 Diagram
A, B, C, D, E Specification class
$T_B$ Operating temperature
$T_S$ Nominal operating temperature
$T_{min}$ Operating temperature
$T_{max}$ Operating temperature
$\lambda_M$ Transmission wavelength
$\lambda_N$ Nominal wavelength
$\lambda_Ü$ Transmission wavelength
$\lambda_{min}$ Transmission wavelength
$\lambda_{max}$ Transmission wavelength

The invention claimed is:

1. A repeater comprising:
a master unit for communicating with a base station of a mobile network;
a plurality of remote units for communicating with mobile communications terminals;
an optical waveguide connecting the remote units with the master unit for transmitting the optical signals from each of the remote units to the master unit;
at least two of the remote units including lasers as transmitters for the optical signals;
the plurality of lasers having similar nominal transmission wavelengths that are provided at a plurality of different nominal operating temperatures including a minimum nominal operating temperature and a maximum nominal operating temperature and being selectively controlled by adjusting their operating temperatures so that the lasers transmit on different transmission wavelengths;
a drive unit configured for selectively adjusting the operating temperatures of the lasers to operate in a defined temperature range between a minimum temperature proximate the minimum nominal operating temperature and a maximum temperature proximate the maximum nominal operating temperature to provide a plurality of different transmission wavelengths for the remote units.

2. The repeater of claim 1, wherein at least one of the lasers includes a Peltier element for adjusting its operating temperature.

3. The repeater of claim 1, wherein the operating temperatures of the lasers are chosen from a temperature range between 20° C. and 35° C.

4. The repeater of claim 1, wherein the transmission wavelengths of the lasers are chosen from a wavelength in the range of 1545 nm to 1551 nm.

5. The repeater of claim 1, wherein the individual transmission wavelengths always have at least one wavelength difference of 0.35 nm between each other.

6. The repeater of claim 1, wherein the master unit transmits optical signals to the remote units and a common optical waveguide is used for both signal transmission from the master unit to the remote units and for signal transmission from the remote units to the master unit.

7. The repeater of claim 1, wherein a laser with a relatively low nominal operating temperature is used for adjusting a transmission wavelength from an upper wavelength range, and a laser with a relatively high nominal operating temperature is used for adjusting a transmission wavelength from a lower wavelength range.

8. A method for operating a repeater that includes a master unit for communicating with a base station of a mobile network, a plurality of remote units for communicating with mobile communications terminals, and an optical waveguide connecting the remote units with the master unit for transmitting optical signals from each of the remote units to the master unit, the method comprising:

transmitting the optical signals from at least two of the remote units using a laser, the plurality of lasers having similar nominal transmission wavelengths that are provided at a plurality of different nominal operating temperatures including a minimum nominal operating temperature and a maximum nominal operating temperature;

selectively adjusting the operating temperatures of the lasers to operate in a defined temperature range between a minimum temperature proximate the minimum nominal operating temperature and a maximum temperature proximate the maximum nominal operating temperature so that the lasers transmit on a plurality of different transmission wavelengths for the remote units.

9. The method of claim 8, wherein at least one of the lasers includes a Peltier element for adjusting its operating temperature.

10. The method of claim 8 further comprising selectively adjusting the operating temperatures with a drive unit.

11. The method of claim 8 further comprising selecting the operating temperatures of the lasers from a temperature range between 20° C. and 35° C.

12. The method of claim 8, wherein the transmission wavelengths of the lasers are chosen from a wavelength in the range of 1545 nm to 1551 nm.

13. The method of claim 8, wherein the individual transmission wavelengths always have at least one wavelength difference of 0.35 nm between each other.

14. The method of claim 8, wherein the master unit transmits optical signals to the remote units, the method further comprising using a common optical waveguide for both signal transmission from the master unit to the remote units and for signal transmission from the remote units to the master unit.

15. The method of claim 8 further comprising using a laser with a relatively low nominal operating temperature for adjusting a transmission wavelength from an upper wavelength range, and using a laser with a relatively high nominal operating temperature for adjusting a transmission wavelength from a lower wavelength range.

* * * * *